United States Patent

Gunther

[15] 3,688,352
[45] Sept. 5, 1972

[54] FASTENER HAVING IMPROVED-LOAD CARRYING CAPACITY

[72] Inventor: Conrad J. Gunther, Uniondale, N.Y.

[73] Assignee: Dzus Fastener Co., Inc., West Islip, N.Y.

[22] Filed: March 24, 1971

[21] Appl. No.: 127,604

Related U.S. Application Data

[63] Continuation-in-part of Ser. No. 866,698, Oct. 19, 1969, Pat. No. 3,594,876.

[52] U.S. Cl. .............................................. 24/221 A
[51] Int. Cl. .............................................. A44b 17/00
[58] Field of Search.............24/221 K, 221 A, 221 R

[56] References Cited

UNITED STATES PATENTS 3,152,822  10/1964  Griffiths....................24/221 K
3,222,744  12/1965  Dellith......................24/221 A

FOREIGN PATENTS OR APPLICATIONS 637,697  5/1950  Great Britain............24/221 A

*Primary Examiner*—Bernard A. Gelak
*Attorney*—Kane, Dalsimer, Kane, Sullivan & Kurucz

[57] ABSTRACT

A fastener for substantially rigidly interengaging two members. The fastener includes a stud element adapted to extend through an opening in one of the members and having a cam slot adapted to engage a pin on the other of the members. A stud element is rotatable between an open and closed position on the pin. A housing surrounds the upper portion of the stud element in rotatable relationship therewith and is positioned on one side of the surface of the one member distal from the other member when the cam slot is engaged with the pin. The housing has surfaces thereon forming a slot in the wall thereof inclined with respect to the transverse axis of the housing. A bar extends laterally from the stud element through the slot and engages the slot forming surface of the housing. The housing has an upper rim and a lower rim and the slot in the wall of the housing extends through at least one rim thereof so as to interrupt the exterior surface of said rim and to facilitate insertion and removal of the bar with respect to the slot. Means are provided for retaining the bar in the slot so that when the pin is in the closed position in the cam slot and the housing or stud are rotated relative to one another, the bar will shift in the slot from a relaxed position to a locked position and will be supported by a portion of the slot forming surfaces while in the locked position to thereby increase the load carrying capacity of the fastener.

8 Claims, 3 Drawing Figures

PATENTED SEP 5 1972 3,688,352

INVENTOR
CONRAD J. GUNTHER
BY
Kane, Dalsimer, Kane, Sullivan & Kurucz
ATTORNEYS

3,688,352

FASTENER HAVING IMPROVED-LOAD CARRYING CAPACITY

CROSS-REFERENCE TO RELATED APPLICATION

This application is a continuation-in-part of application Ser. No. 866,698, filed Oct. 19, 1969, now U.S. Pat. No. 3,594,876 and incorporates by reference all of the subject matter contained therein.

BACKGROUND OF THE INVENTION

The load-carrying capacity of fastening devices similar to those shown in Dzus U.S. Pat. No. 2,337,457, is generally limited by the capacity of the spring which urges the coupling elements into engagement. The force exerted on the panel mounted pin by the stud element is limited by the size of the spring interposed between the pin and stud element. For many applications, this is quite acceptable, however, there are certain instances where it is desirable to have a more rigid fastening member and one which will withstand greater loads.

Furthermore, under certain circumstances, the attached panels may become exposed to excessive vibration and when common types of spring loaded fasteners such as those described in the above mentioned patent are employed, excessive wear may occur on the panels at the point of attachment. This excessive wear has a deleterious effect on the attached panel arrangement such that the panels may become loose or damaged in other ways. Naturally, this is extremely undesirable in the art and, therefore, under the circumstances discussed above, a fastener which would specifically overcome the discussed problems would be extremely advantageous.

It should also be kept in mind that a fastener of the desired type should be constructed so as to be easily manufactured and assembled. Naturally, the design should not detract from the strength and operation of the fastener.

SUMMARY OF THE INVENTION

With the above in mind, among the primary objectives of the invention are to provide a fastener assembly capable of handling increased loads placed upon panels or other members joined by the fastener, and which will prevent excessive wear about the point through which it is inserted in a panel subjected to a large amount of vibration. Additionally, the fastener is of a design which facilitates manufacture and assembly thereof without detracting from the previously mentioned objectives of the design. Consequently, a more economical fastener is provided to accomplish the desired results.

The fastener is designed for substantially rigidly interengaging two members. The fastener includes a stud element adapted to extend through an opening in one of the members and has a cam slot adapted to engage a pin on the other of the members. A stud element is rotatable between an open and closed position on the pin. A housing surrounds the upper portion of the stud element in rotatable relationship therewith and is positioned on one side of the surface of the one member distal from the other member when the cam slot is engaged with the pin. The housing has surfaces thereon forming a slot in the wall thereof inclined with respect to the transverse axis of the housing. A bar extends laterally from the stud element through the slot and engages the slot forming surface of the housing. The housing has an upper and a lower rim and the slot in the wall of the housing extends through at least one rim thereof so as to interrupt the exterior surface of the rim and to facilitate insertion and removal of the bar with respect to the slot. Means are provided for retaining the bar in the slot so that when the pin is in the closed position in the cam slot and the housing or stud are rotated relative to one another, the bar will shift in the slot from a relaxed position to a locked position and will be supported by a portion of the slot forming surfaces while in the locked position to thereby increase the load-carrying capacity of the fastener.

With the above comments in mind, reference is had to the attached drawings.

DESCRIPTION OF THE PREFERRED EMBODIMENT

Figure 1:
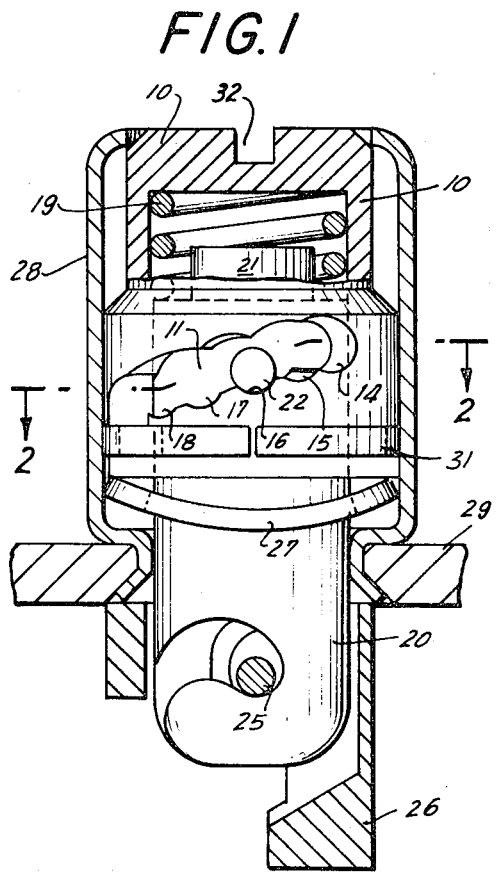
FIG. 1 is a vertical sectional view of the fastener with the support bar rotated into a locked position.
Figure 3:
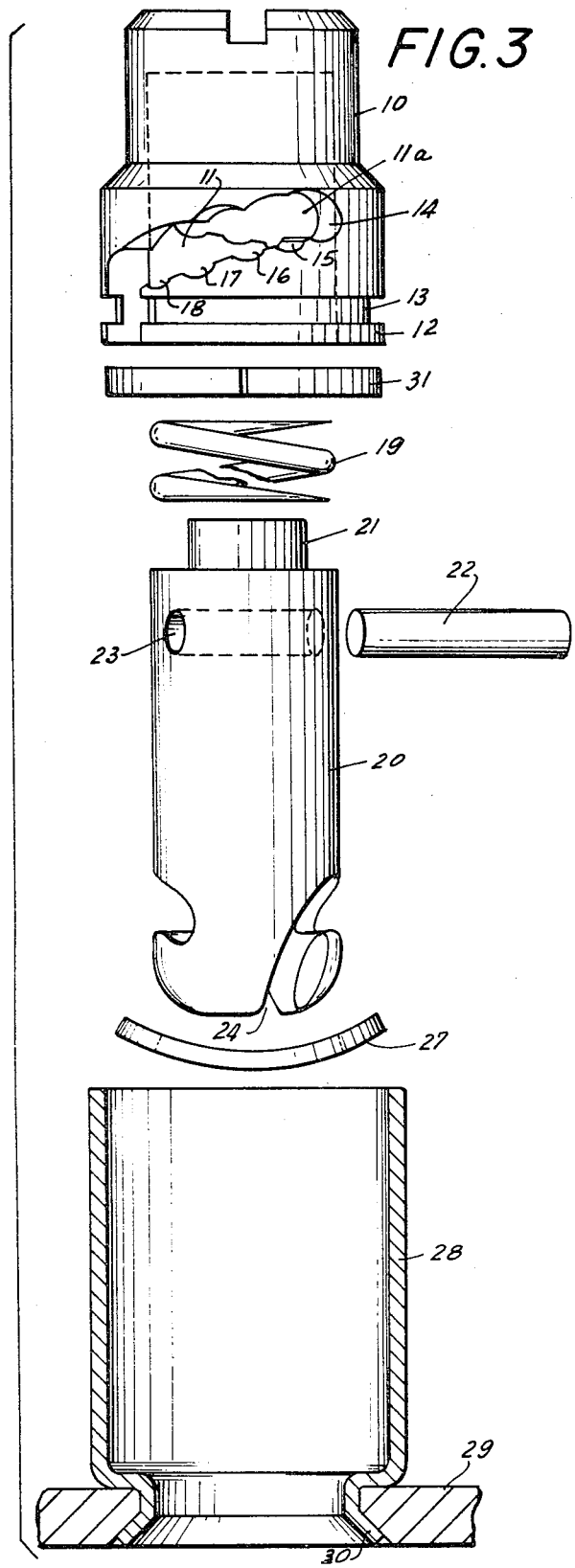
FIG. 3 is a partially sectional exploded perspective view of the fastener.
Figure 2:
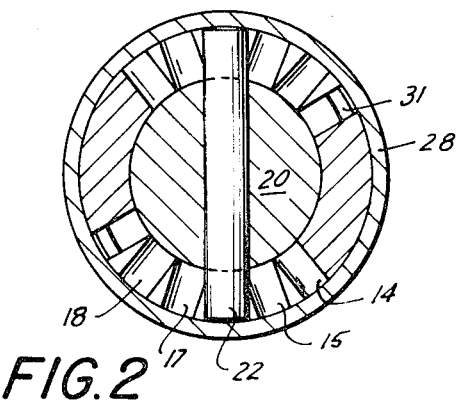
FIG. 2 is a top sectional view thereof taken along the plane of line 2—2 of FIG. 1.

Initially turning to FIG. 1 of the drawing, the fastener is shown in a disassembled exploded relationship. Housing 10 is provided with a pair of diametrically opposed inclined slots 11 and 11a. The number of slots employed for a particular fastener housing is a matter of choice, for example such as 1, 2 or 4. For exemplary purposes, a fastener having two diametrically opposed slots is shown in the embodiment described herein.

Each slot is inclined upwardly around the cylindrically shaped housing 10 with respect to the transverse axis of housing 10.

The lower end of each slot extends to the lower rim 12 of the housing and interrupts that rim to permit ready access to the slot.

The major portion of the slot inclines openly around the cylindrically shaped housing 10 with respect to the transverse axis of the housing 10. The lower end portion of the slot extends axially downward until it interrupts lower rim 12.

Housing 10 also contains a circumferential annular recess 13 adjacent to rim 12. Recess 13 is interrupted by the lower end portion of the slot as it extends axially downward to rim 12. Naturally, a similar interruption of recess 13 and rim 12 would be provided where each lower end of each respective slot in housing 10 is located.

Each slot has a multiplicity of notches along its inclined surface terminating in a final positioning notch 14 at its upper extremity. Any number of serrations or notches may be provided in the surface of slot 11 as desired. For example, in the depicted embodiment along with upper notch 14 four additional notches 15, 16, 17 and 18 are shown along the inclined surface of slot 11. Naturally, all slots in housing 10 would have a similar notched or serrated arrangement.

The serrations are present due to the use of this type of fastener with different thicknesses of panels and members to be fastened together. When thicker panels are being fastened, the fastener may lock at an intermediate position between upper notch 14 and lower notch 18 as shown in FIG. 1. Conversely, when the panels being fastened are thinner, it may be required to rotate housing 10 to its fullest extent until the locking bar is seated in upper serration or notch 14. In this manner, the fastener is adaptable for use with a variety of different thickness panels.

A spring 19 is interposed between housing 10 and a stud element 20 and encircles hub 21 extending from the upper end of stud 20 when stud 20 is positioned within housing 10. An appropriate recess or chamber is located in the interior of housing 10 to receive spring 19 and the upper portion of stud member 20 including hub extension 21. A support bar 22 is mounted within transverse bore 23 of substantially cylindrically shaped stud 20. Bar 22 is slightly larger than the diameter of stud 20 so that a small end portion of each end of bar 22 extends outwardly from the outer surface of stud 20 at approximately diametrically opposed points on the outer surface of stud 20. Support bar 22 may also be formed integrally with stud 20 so that the opposed transversely extending surfaces are merely projections on the outer surface of cylindrically shaped stud 20.

Stud element 20 is provided with a cam slot 24 at its lower end for engaging a pin 25 located in a cylindrical recess which together form a receptacle in a member or panel 26. The receptacle formed by pin 25 and its accompanying recess in panel or member 26 is dimensioned so as to receive the forward end of stud 20.

A washer 27 is positioned about stud element 20 and both are mounted in cup 28 with the lower end of stud 20 including cam surface 24 extending through an opening in the lower end of cup 28. Stud 20 extends downwardly from cup 28 through an opening in a panel or member 29 and into the receptacle in panel or member 26 where cam surface 24 engages with pin 25 at which time the fastener is in position for mounting panel 29 to panel or member 26. The receptacle is formed in a panel or receptacle strip which in turn is mounted on a suitable support or frame (not shown). This is accomplished by any common type of fastening means such as a screw, bolt or rivet. Naturally, other types of common mounting means are quite acceptable for rigidly mounting strip or member 26 to the support or frame.

In regard to cup 28, as shown in the drawings, its lower end is reduced in size and has a beveled flange thereon with the reduced portion and flange 30 engaging with corresponding surfaces surrounding the opening in panel 29 to mount cup 28 in fixed position with respect to the panel 29.

FIG. 1 shows the fastener fully assembled and mounted on panel 29 and the fastener assembly in locked position with panel 29 affixed to strip or member 26. To reach this position, several assembly steps must occur. Initially, the support bar 22 must be positioned within stud 20 as described above and stud 20 must be inserted into housing 10. The opening at the lower end of slot 11 permits ease of insertion of the projecting ends of support bar during this assembly step. Thereafter, to retain bar 22 in slot 11, a locking ring 31 is positioned in recess 13. This locking ring forms a bottom engaging surface for the projections of bar 22 extending outwardly from stud 20 so as to retain stud 20 within the housing prior to final locking engagement. Manufacturing of the assembly is facilitated in that formation of slot 11 is considerably easier to accomplish if it can be initiated at an extremity of the housing such as lower rim 12. This is particularly true if the slot is to be formed by a milling operation. Naturally, assembly is facilitated by the additional fact that the stud and the attached projecting portions of pin 22 can be merely inserted upward into the housing with the pin easily sliding into position in the appropriate slot. Thereafter, it is a relatively simple operation to attach locking ring 31 to the housing and in that manner retain pin 22 in slot 11. In this manner, manufacture and assembly of the fastener is greatly facilitated and a lower cost product results therefrom.

After locking ring 31 has been properly positioned in recess 13, the projecting portions of pin 22 rest on the upper surface of locking ring 31 in the relaxed or unlocked position. Retention in this position is assisted by the force exerted by spring 19 located in housing 20. The force exerted by spring 19 is sufficient to retain the exposed end portion of bar 22 in the portion of slot 11 where it is in engagement with locking ring 31. This position is maintained during assembly of the panels and the fastener with respect thereto and prior to ultimate locking of the fastener.

To reach the locked position as shown in FIG. 1 from the unlocked position as described immediately above, the following steps are initiated. First, the forward end of stud 20 is positioned within the provided receptacle so that cam slot 24 engages with pin 25. Then, a tool is inserted in notch 32 on the upper surface of housing 10 and the assembly formed by housing 10 and stud 20 are then freely rotated until pin 25 reaches the closed position within cam slot 24. During this process, spring 19 assists in retaining bar 22 in slot 11 so that it is in engagement with the upper surface of locking ring 31 and no tension is applied in any portion of the fastener assembly or with respect to members 29 and 26.

Thereafter, further rotation of housing 10 and connected stud 20 will cause the projecting portion of support bar 22 to be displaced from contact with locking ring 31 and shifted along the inclined surface of slot 11 until it becomes seated in one of the notches along slot 11. The particular notch where the final locking engagement occurs will be determined by the thickness of the panels as described above.

The fastener disclosed in the depicted embodiment is a substantially rigid fastener. However, there is a slight spring action present in the assembly which is produced by deformation of pin 25 when the locking engagement is arrived at and by the fact that washer 27 is initially curved in configuration so that when the fastener is moved to the locked position the curved washer will be deformed to a substantially flat configuration thereby providing a slight deformation and resultant spring action. This action in combination with the deformation and spring action of pin 25 serve to resiliently react to tightening of the fastener and assist in taking up part of the load when members 29 and 26 are locked together. Naturally, when the fastener is disengaged the deformed washer 27 will substantially return to its initial configuration as will pin 25. It should also be kept in mind that the upper slot wall need not be serrated and can be produced with a uniform surface without detracting from the load-carrying capacity of the fastener as shown.

The resiliency of the various interconnected members including pin 25 and washer 27 as discussed above facilitates the displacement of bar 22 from its relaxed position to the locked position. During the shifting operation, spring 19 is slightly compressed and an upward force is exerted by the forward end portion of stud 20 on pin 25. In this manner, members 29 and 26 are drawn into tight engagement with the majority of the force required to retain the members in fixed relationship being supplied by housing 10 in engagement with the undersurface of support bar 22. In this manner, it can be seen how the strength of the individual fastener employed is dependent upon the strength of the housing and the support bar.

To release the fastener, all that is required is a counter-rotation of housing 10 and stud 20 with sufficient force applied to displace bar 22 from the appropriate notch and rotated down into its initial relaxed or unlocked position in communication with the upper surface of locking ring 31. Once again, the resiliency in the fastener as discussed above facilitates this shifting of bar 22. Continued rotation in the same direction of housing 10 and stud 20 will cause cam slot 24 to become disengaged with pin 25 once again thereby permitting members 29 and 26 to become disengaged.

It should be kept in mind that since each projection extending from stud 20 as exemplified by the outwardly extending ends of support bar 22 is similarly mounted in a slot as represented by slots 11 and 11a and the rotating action to accomplish the fastening means of this structure will cause simultaneous shifting of each projection to the locked position. Additional projections and corresponding slots provide additional support for the fastener means and facilitates the provision of a fastener having an increased load-carrying capacity. It can be readily seen that by having the fastening load supported by the housing wall rather than merely a spring such as spring 19 utilized in previous fastening devices, a much stronger fastener is present.

In summary, as support bar 22 shifts between the relaxed and locked position, it urges stud element 20 upward and thus increases the upward force or tension exerted on pin 25. The increase tension on pin 25 is borne by the housing wall bearing upward against support bar 22. This design permits the load-carrying capacity of the fastener to be limited only by the weakest part of the assembly which would most likely be the weakest part of the stud. In regard to the embodiment shown, the load capacity of the fastener will be about 400 pounds. This is a considerable improvement over previously used fasteners of this type where a spring such as spring 20 would carry the load and would generally not carry a load much over 15 pounds. Furthermore, because of the increased rigidity of the fastening engagement, less play will occur between the fastened members and consequently, excessive wear will be reduced about the panel opening through which the cup is inserted when the assembly is exposed to a large amount of vibration, particularly over lengthy periods of time. Finally, the provision of the extended slot and locking ring arrangement of the depicted embodiment facilitates manufacture and assembly of the fastener without detracting from its load-carrying capacity. This results in a low cost product which may be easily manufactured and produced on a large scale.

Thus, the above mentioned objects and advantages of the invention are effectively attained.

I claim:

1. A fastener for substantially rigidly interengaging two members comprising:
   a stud element adapted to extend through an opening in one of said members and having a cam slot adapted to engage a pin on the other of said members;
   said stud element being rotatable between an open and closed position on the pin;
   a housing surrounding the upper portion of the stud element in rotatable relationship therewith and being positioned on one side of the surface of said one member distal from said other member when said cam slot is engaged with the pin;
   said housing having surfaces thereon forming a slot in the wall thereof inclined with respect to the transverse axis of the housing;
   a bar extending laterally from the stud element through the slot and engaging the slot forming surfaces of said housing;
   the housing having an upper rim and a lower rim and the slot in the wall of the housing extending through at least one rim thereof so as to interrupt the exterior surface of said rim and to facilitate insertion and removal of the bar with respect to the slot; and
   means for retaining the bar in the slot so that when the pin is in the closed position in the cam slot and the housing or stud are rotated relative to one another, the bar will shift in the slot from a relaxed position to a locked position and will be supported by a portion of said slot forming surfaces while in the locked position to thereby increase the load carrying capacity of the fastener.

2. The invention in accordance with claim 1 wherein the means for retaining the bar in the slot includes removable locking means on the housing.

3. The invention in accordance with claim 2 wherein the removable locking means includes an annular recess on the circumference of said housing and positioned so as to intersect the slot and a removable lock ring in said recess so as to close the opening to said slot and to open the slot of said housing when removed from the recess to permit removal of the bar through said one rim of the housing.

4. The invention in accordance with claim 1 wherein the inner upper surface of said housing is spaced from the upper end of said stud to thereby form a chamber therebetween, a spring in said chamber and being compressed a predetermined amount so as to bear against the upper surface of said stud and facilitate the retention of said bar in the relaxed position in said slot.

5. The invention in accordance with claim 1 wherein a cup surrounds the housing and stud assembly.

6. The invention in accordance with claim 1 wherein means are included for retaining the bar in position at intermediate positions along the inclined slot including a plurality of serrations extending along the inclined slot to permit the seating of the bar in intermediate retention positions in the inclined slot.

7. The invention in accordance with claim 1 wherein a washer is provided between the bottom surface of the housing and said one member, said washer being resilient and arcuate in normal configuration and being responsive to rotation between the stud and housing to facilitate movement of the bar between the relaxed and locked positions while retaining the increased load carrying capacity of the fastener.

8. The invention in accordance with claim 1 wherein said housing includes a pair of diametrically opposed slots with each slot having a bar positioned therein, said bar is being simultaneously transferred between the relaxed and locked positions upon relative rotation between said stud and said housing.

* * * * *